US008571241B2

(12) United States Patent
Larsen

(10) Patent No.: US 8,571,241 B2
(45) Date of Patent: Oct. 29, 2013

(54) HEARING AID WIRELESS NETWORK

(75) Inventor: Rene Rye Larsen, Bagsvaerd (DK)

(73) Assignee: GN ReSound A/S, Ballerup (DK)

( * ) Notice: Subject to any disclaimer, the term of this patent is extended or adjusted under 35 U.S.C. 154(b) by 457 days.

(21) Appl. No.: 12/858,272

(22) Filed: Aug. 17, 2010

(65) Prior Publication Data

US 2011/0033071 A1 Feb. 10, 2011

Related U.S. Application Data

(63) Continuation of application No. 10/559,498, filed as application No. PCT/DK2004/000389 on Jun. 7, 2004, now Pat. No. 7,778,432.

(30) Foreign Application Priority Data

Jun. 6, 2003 (DK) .................................. 2003 00856

(51) Int. Cl.
H04R 25/00 (2006.01)
(52) U.S. Cl.
USPC .......................................... 381/315; 709/209
(58) Field of Classification Search
USPC .......................................... 381/315; 709/209
See application file for complete search history.

(56) References Cited

U.S. PATENT DOCUMENTS

| 5,710,762 | A | 1/1998 | Petranovich |
| 5,721,783 | A | 2/1998 | Anderson |
| 5,956,330 | A | 9/1999 | Kems |
| 6,366,622 | B1 | 4/2002 | Brown et al. |
| 6,549,633 | B1 * | 4/2003 | Westermann ................. 381/312 |
| 6,768,802 | B1 | 7/2004 | Baechier |
| 6,839,447 | B2 * | 1/2005 | Nielsen et al. ................ 381/312 |
| 6,950,645 | B1 | 9/2005 | Kammer et al. |
| 7,184,458 | B2 | 2/2007 | Schmidl et al. |
| 7,215,923 | B2 | 5/2007 | Hillyard |
| 7,254,246 | B2 | 8/2007 | Jakob |
| 7,349,549 | B2 | 3/2008 | Bachler et al. |
| 7,580,535 | B2 * | 8/2009 | Baechler ...................... 381/315 |

(Continued)

FOREIGN PATENT DOCUMENTS

| EP | 1 261 235 A2 | 11/2002 |
| EP | 1 261 235 A3 | 8/2004 |

(Continued)

OTHER PUBLICATIONS

Non-Final Office Action for U.S. Appl. No. 10/559,498; mailed on Jul. 8, 2009.

(Continued)

Primary Examiner — Curtis Kuntz
Assistant Examiner — Ryan Robinson
(74) Attorney, Agent, or Firm — Vista IP Law Group, LLP

(57) ABSTRACT

A hearing aid includes a transceiver for interconnection of the hearing aid with a wireless network, and a communication controller that is adapted for controlling data exchange through the network in accordance with a network protocol, wherein the controller is further adapted for initialisation of the network in an acquisition mode by controlling the transceiver to transmit interrogation data repetitively, and upon receipt of an interrogation data received message from another device, in a connected mode acting as a master of the network by repetitively transmitting synchronization data at intervals that are longer than the intervals between transmitted interrogation data in the acquisition mode.

21 Claims, 11 Drawing Sheets

(56) References Cited

U.S. PATENT DOCUMENTS

Figure 1:
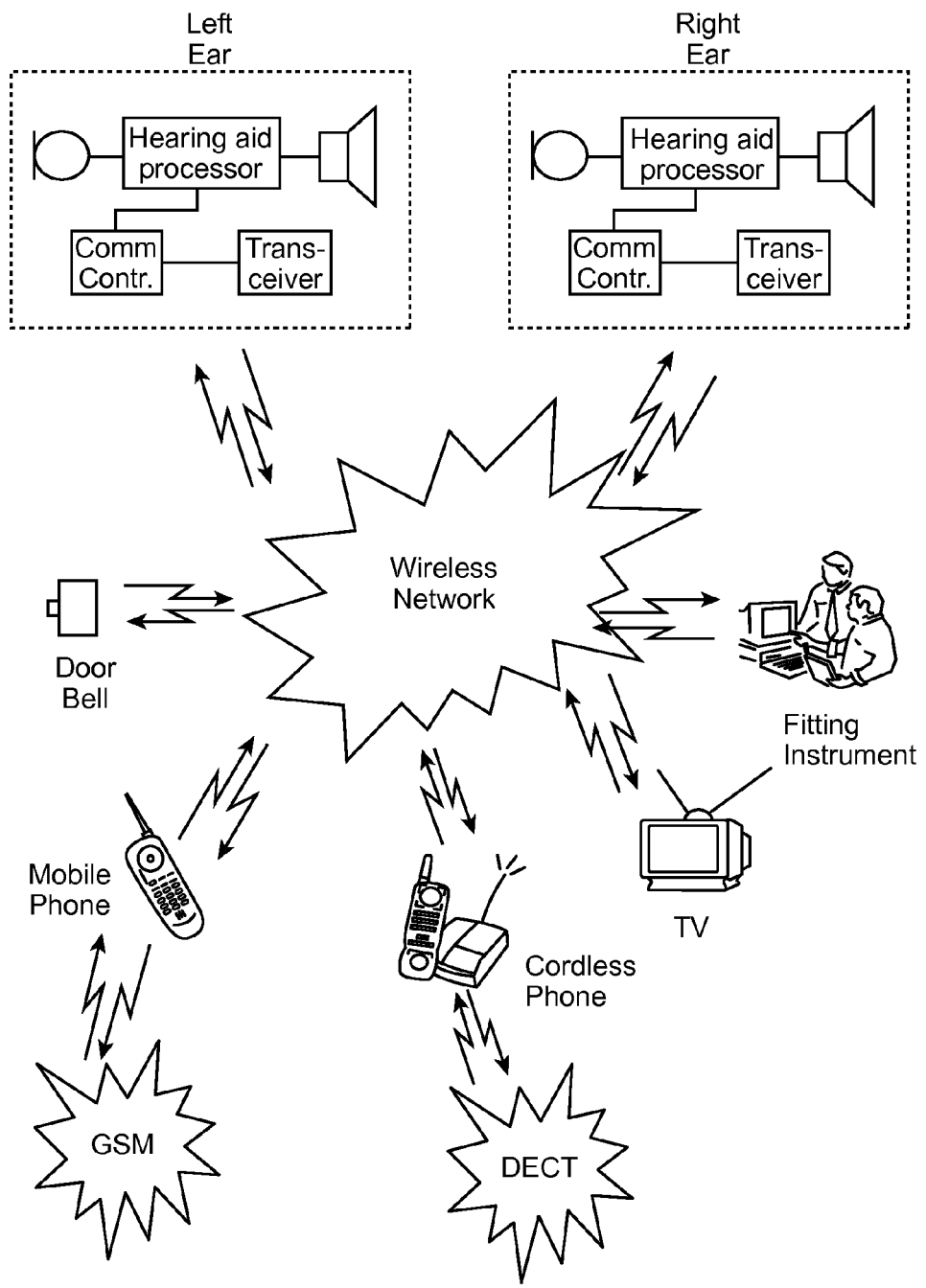

| | | | |
|---|---|---|---|
| 7,738,913 B2* | 6/2010 | Hilpisch et al. | 455/550.1 |
| 7,844,062 B2* | 11/2010 | Bauml et al. | 381/312 |
| 8,194,902 B2* | 6/2012 | Pedersen | 381/315 |
| 2002/0044669 A1 | 4/2002 | Meyer et al. | |
| 2002/0071581 A1 | 6/2002 | Leysieffer et al. | |
| 2003/0045283 A1 | 3/2003 | Hagedoorn | |
| 2004/0190737 A1 | 9/2004 | Kuhnel et al. | |
| 2005/0069163 A1 | 3/2005 | O'Brien | |
| 2006/0039577 A1* | 2/2006 | Sanguino et al. | 381/315 |
| 2007/0086601 A1* | 4/2007 | Mitchler | 381/79 |

FOREIGN PATENT DOCUMENTS

| | | |
|---|---|---|
| WO | 99/43185 | 8/1999 |
| WO | 01/54458 A2 | 7/2001 |
| WO | 01/54458 A3 | 7/2001 |
| WO | 02/28036 A1 | 4/2002 |

OTHER PUBLICATIONS

Final Office Action for U.S. Appl. No. 10/559,498; mailed on Jan. 28, 2010.

International Preliminary Examination Report for International Application No. PCT/DK2004/000389 dated Jun. 12, 2005.

Written Opinion of the International Searching Authority for International Application No. PCT/DK2004/000389 dated Jun. 12, 2005.

International Search Report for International Application No. PCT/DK20041000389 dated Feb. 2, 2005.

Notice of Allowance and Fees Due dated Apr. 15, 2010 for U.S. Appl. No. 10/559,498.

* cited by examiner

HEARING AID WIRELESS NETWORK

RELATED APPLICATION DATA

This application is a continuation of U.S. patent application No. 10/559,498, filed Jun. 5, 2006, which is the national stage filing of PCT International Application No. PCT/DK2004/000389, filed Jun. 7, 2004, now expired, which claims priority to and the benefit of Danish Patent Application No. PA 2003 00856, filed Jun. 6, 2003, the disclosures of which are expressly incorporated herein by reference.

The present invention relates to a hearing aid wireless network for wireless interconnection of hearing aids, and wireless interconnection of hearing aids with other devices, such as a remote control for a hearing aid, a fitting instrument, a mobile phone, a headset, a door bell, an alarm system, a broadcast system, e.g. replacing a tele coil system, etc, etc.

WO 01/54458 discloses a method and a system for fitting, programming, or upgrading a hearing aid system. One system includes the use of a mobile device to interact with the hearing aid system through a short-range network. The short-range network is a pico-cellular network including Bluetooth technology. It is suggested to use Bluetooth to interconnect the hearing aid with cellular phones, audio headsets, computer laptops, personal digital assistants, digital cameras, etc. Other radio networks are suggested, namely HomeRF, DECT, PHS, or Wireless LAN (WLAN).

However, the suggested conventional communication protocols require a large amount of code for their implementation. For example, the Bluetooth protocol requires 80-100 Kbytes code. Further, the power consumption during execution of the protocols is significant rendering the bluetooth protocol impractical in a hearing aid.

Thus, there is a need for a wireless network with a communication protocol that is simple thereby requiring a small amount of code and with low power consumption during operation. Further, the acquisition time should be low, and the latency should be low.

In accordance with a first aspect of the invention, the above and other objects are fulfilled by provision of a hearing aid comprising a transceiver for interconnection of the hearing aid with a wireless network for communication with a plurality of other devices, and a communication controller that is adapted for controlling data exchange through the network in accordance with a simple network protocol.

The hearing aid wireless network according to the invention facilitates interconnection of a plurality of devices in the network, such as hearing aids, remote controllers, fitting instruments, mobile phones, headsets, door bells, alarm systems, broadcast systems, such as tele coil replacement, etc, etc.

Typically, in the hearing aid transceiver, transmission requires less power than reception. Therefore, the protocol according to the present invention seeks to minimize the time used for reception of data, e.g. during acquisition.

Acquisition is the process of initially establishing a network and the process of a new device establishing connection with an existing network.

In an established network, the master device, in a connected mode, regularly transmits synchronization data, e.g. comprised in a link management package, for synchronization of the slave devices in the network with the master device. During initialisation of the network, for example upon turn-on of two hearing aids, each device in an acquisition mode transmits interrogation data, e.g. comprised in a link management package, at a higher rate than the rate of transmission of the synchronization data in the connected mode.

The acquisition method according to the present invention has low power consumption during execution and it is fast.

Thus, it is an important advantage of the present invention that a hearing aid may connect with the network with a low power consumption adequately supplied by, e.g., conventional $ZnO_2$ batteries, and that the protocol may be implemented in the hearing aid with a low number of instructions, such as app. 1000 instructions. Further, it has a low acquisition time, at least during initialisation of the network.

The transceiver and communication controller may operate according to a frequency division multiplex scheme (FDM) wherein the frequency range utilized by the network is divided into frequency channels, and different devices in the network communicate in specific respective frequency channels.

Alternatively, the transceiver and communication controller may operate according to a time division multiplex scheme (TDM) wherein the time is divided into numbered time slots and different devices in the network communicate in specific respective time slots.

The transceiver and communication controller may also operate according to a combined FDM and TDM scheme.

Preferably, the transceiver and communication controller operates according to a frequency diversification or spread spectrum scheme, i.e. the frequency range utilized by the network is divided into a number of frequency channels, and transmissions switch channels according to a predetermined scheme so that transmissions are distributed over the frequency range. According to the present invention, a frequency hopping algorithm is provided that allows devices in the network to calculate what frequency channel the network will use at any given point in time without relying on the history of the network, e.g. based on the present frequency channel number, a pseudo-random number generator calculates the next frequency channel number. This facilitates synchronization of a new device in the network, e.g. the new device comprises the same pseudo-random number generator as the devices already connected in the network. Thus, upon receipt of the current frequency channel number during acquisition, the new device will calculate the same next frequency channel number as the other devices in the network.

Preferably, one device in the network is a master device. All other devices in the system synchronize to the timing of the master device, and preferably, the master device is a hearing aid, since the hearing aid user will always carry the hearing aid when he or she uses the network.

Every device in the network has its own identification number, e.g. a 32-bit number. Globally unique identities are not required since the probability of two users having hearing instruments with identical identifications is negligible.

Preferably, a new device is automatically recognized by the network and interconnected with the network.

It is an advantage of a network operating according to a spread spectrum scheme that the communication has a low sensitivity to noise, since noise is typically present in specific frequency channels, and communication will only be performed in a specific channel for a short time period after which communication is switched to another channel.

Further, several networks may co-exist in close proximity, for example two or more hearing aid users may be present in the same room without network interference, since the probability of two networks simultaneously using a specific frequency channel will be very low.

Likewise, the hearing aid network may coexist with other wireless networks utilizing the same frequency band, such as Bluetooth networks or other wireless local area networks.

In accordance with a second aspect of the invention, hearing aids according to the present invention may advantageously be incorporated into a binaural hearing aid system, wherein two hearing aids are interconnected through the wireless network for digital exchange of data, such as audio signals, signal processing parameters, control data, such as identification of signal processing programs, etc, etc, and optionally interconnected with other devices, such as a remote control, etc.

Devices remotely located in relation to the devices in the network may desirably provide signals to a hearing aid or another device in the wireless network. Such a remotely located device may be a doorbell, an alarm clock, a broadcasting system, etc. In their remote locations, such devices may not receive synchronization information transmitted by the master of the network and thus, may not be able to synchronize to the network. On the other hand, typically, such devices are not subject to power limitations, and therefore such devices are adapted to, in accordance with the present invention, transmit information during a long time period in one or more predetermined frequency channels thereby enabling reception of the information by the intended device in the network.

Figure 2:
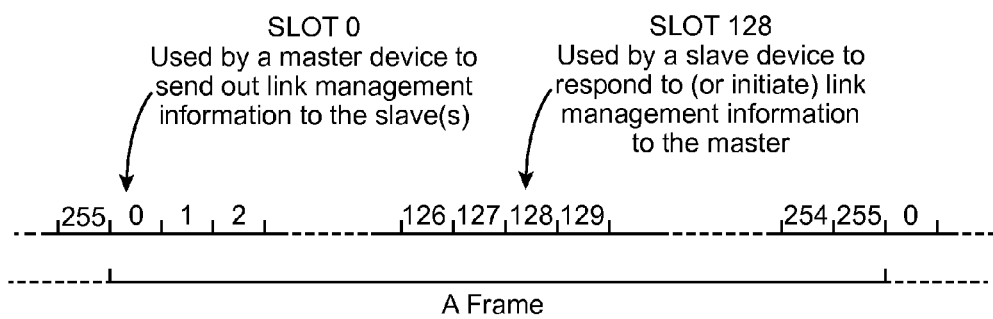
Figure 3:
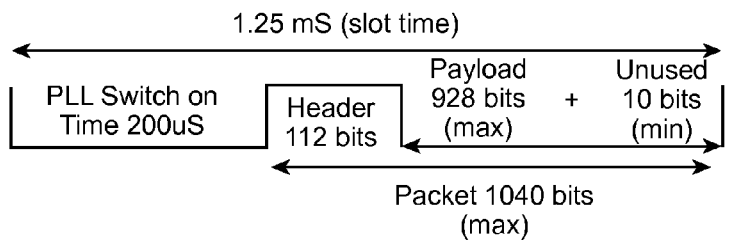
Figure 4:
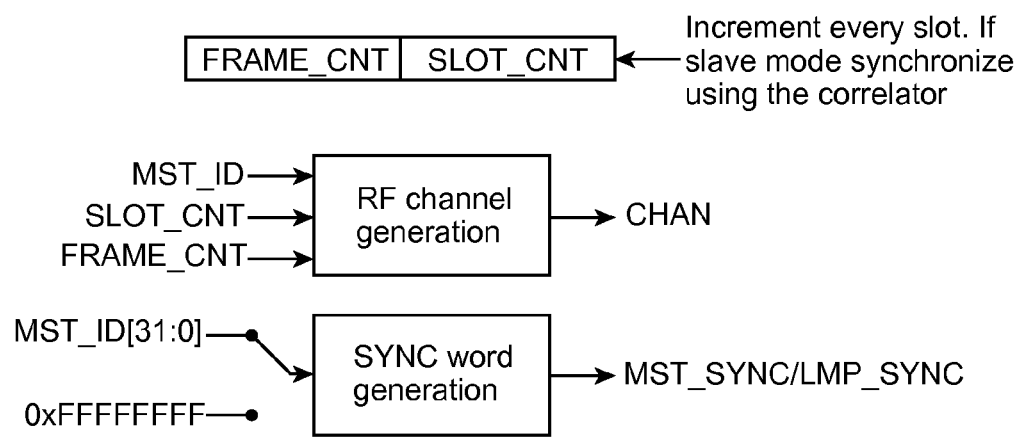
Figure 5:
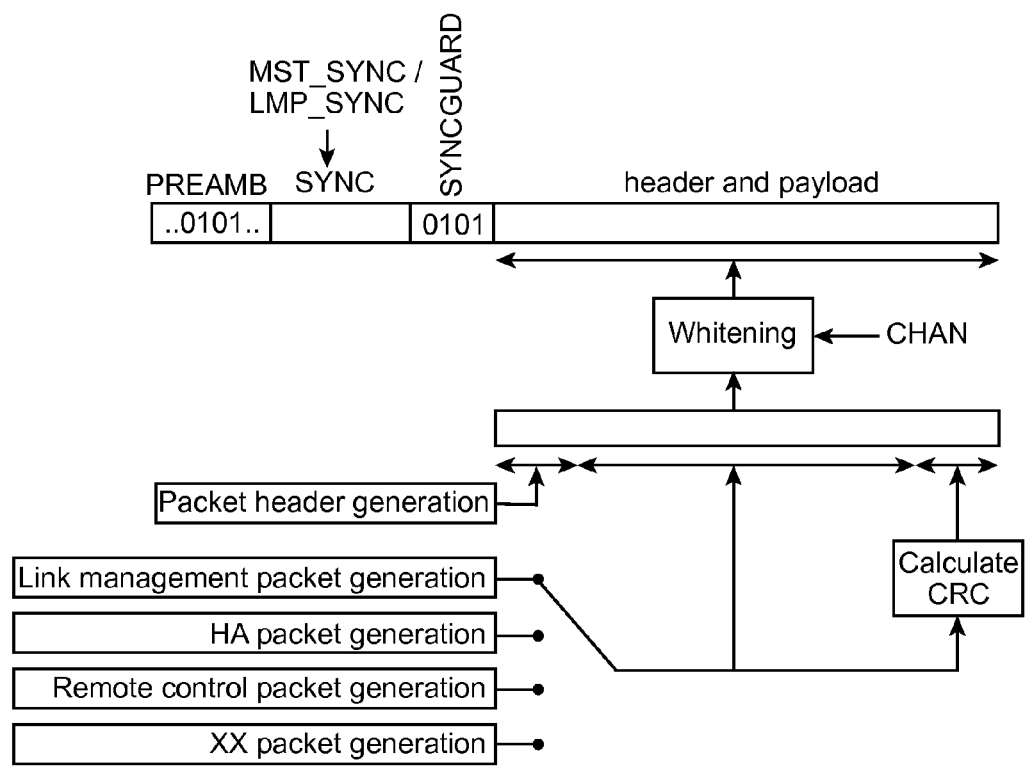
Figure 6:
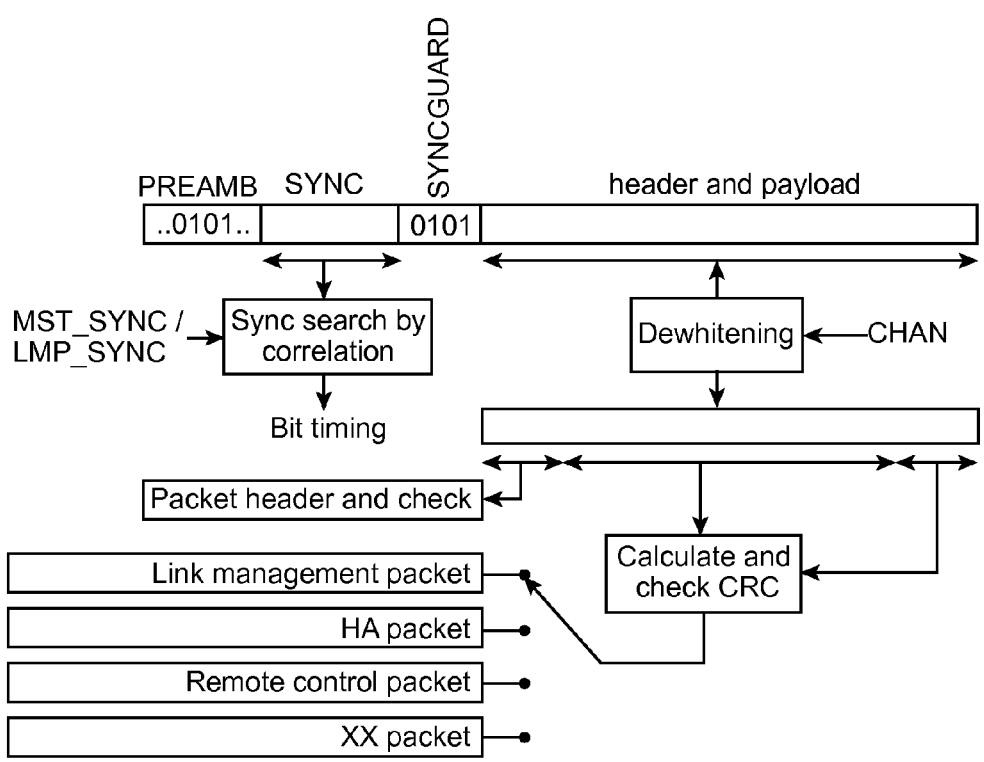
Figure 7:
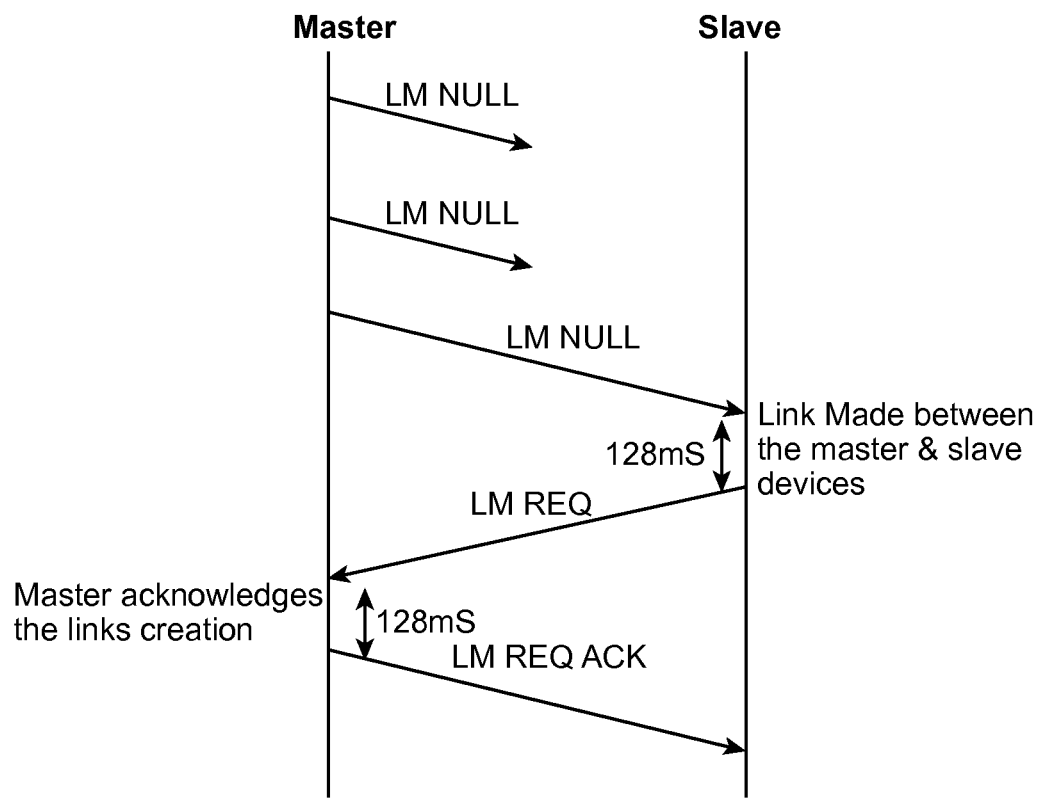
Figure 8:
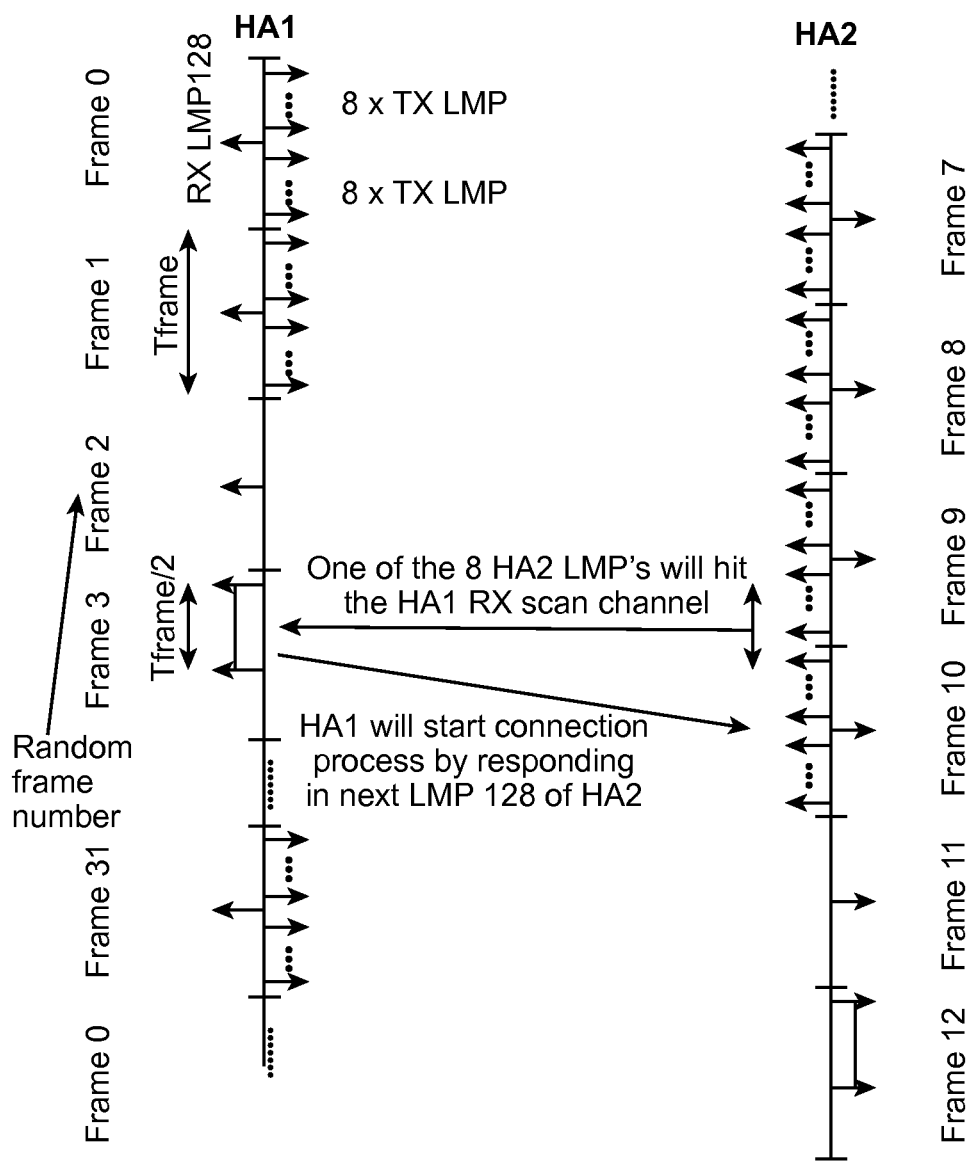
Figure 9:
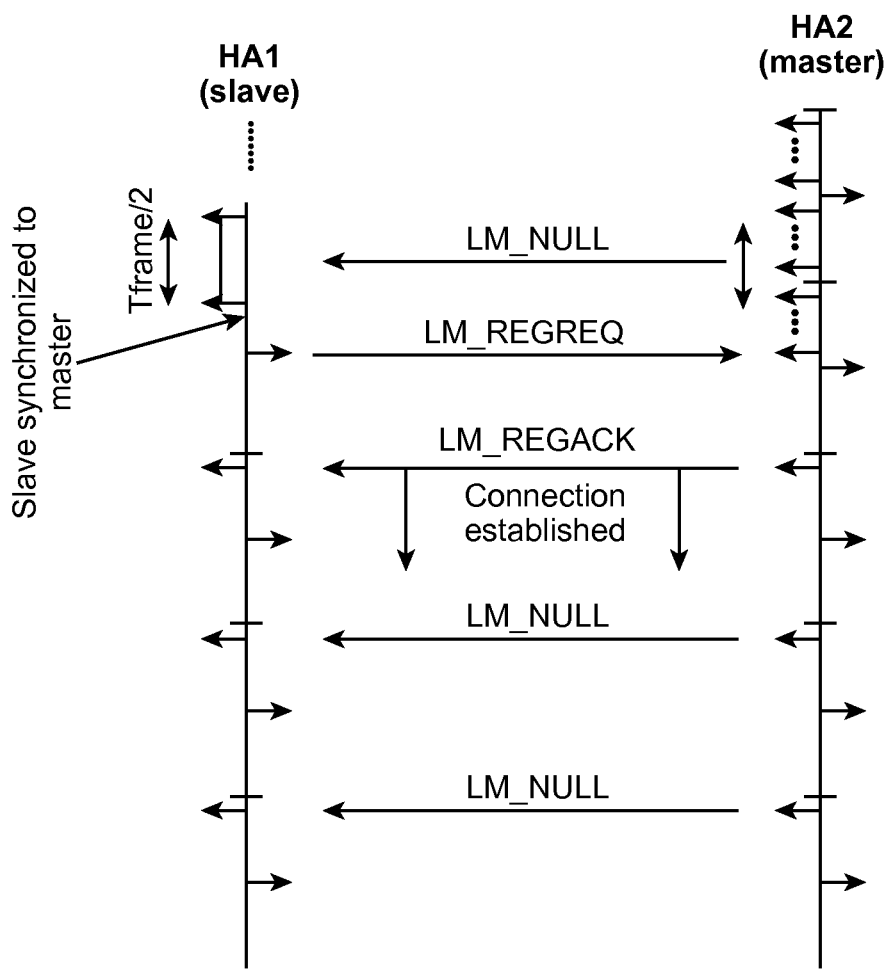
Figure 10:
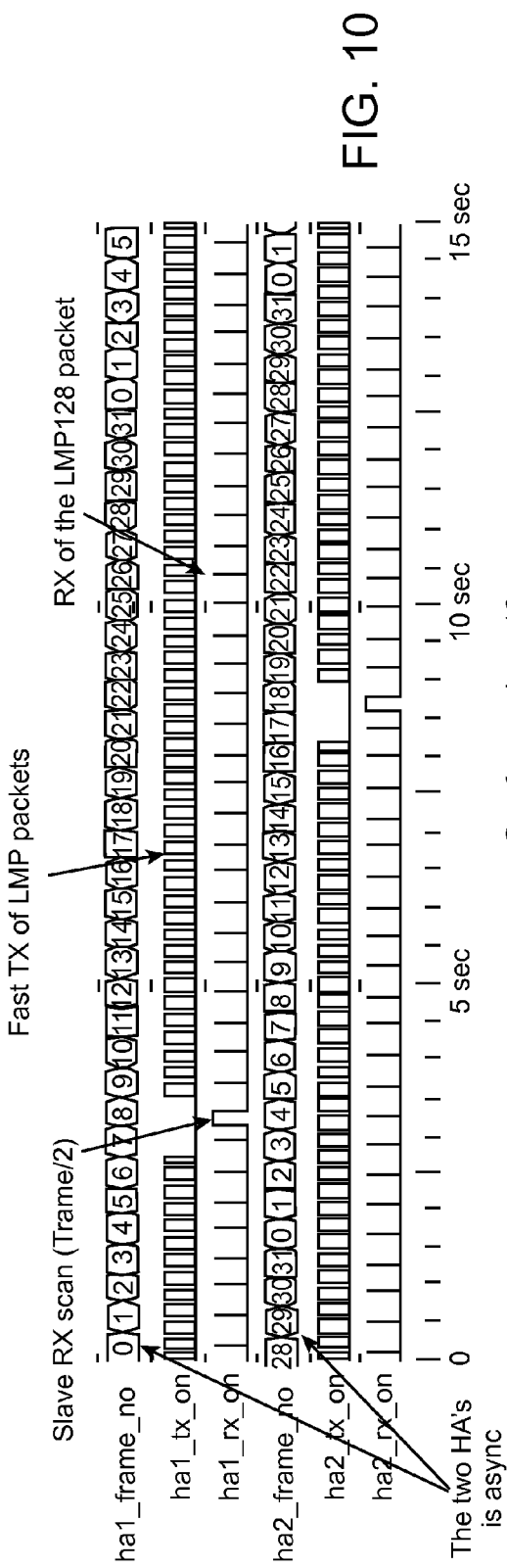
Figure 11:
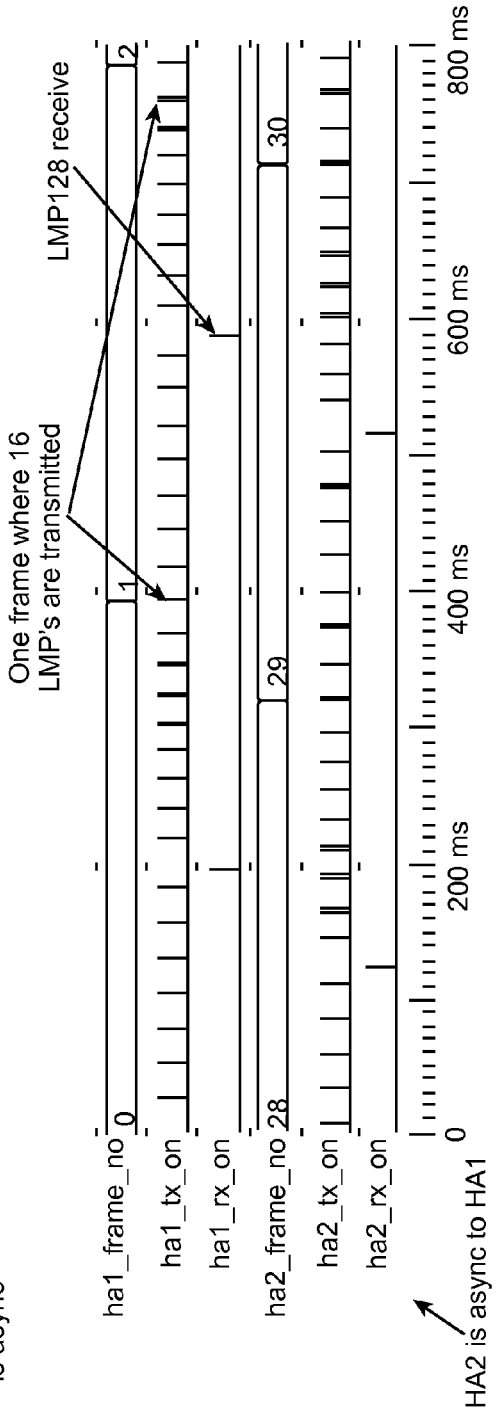
Figure 12:
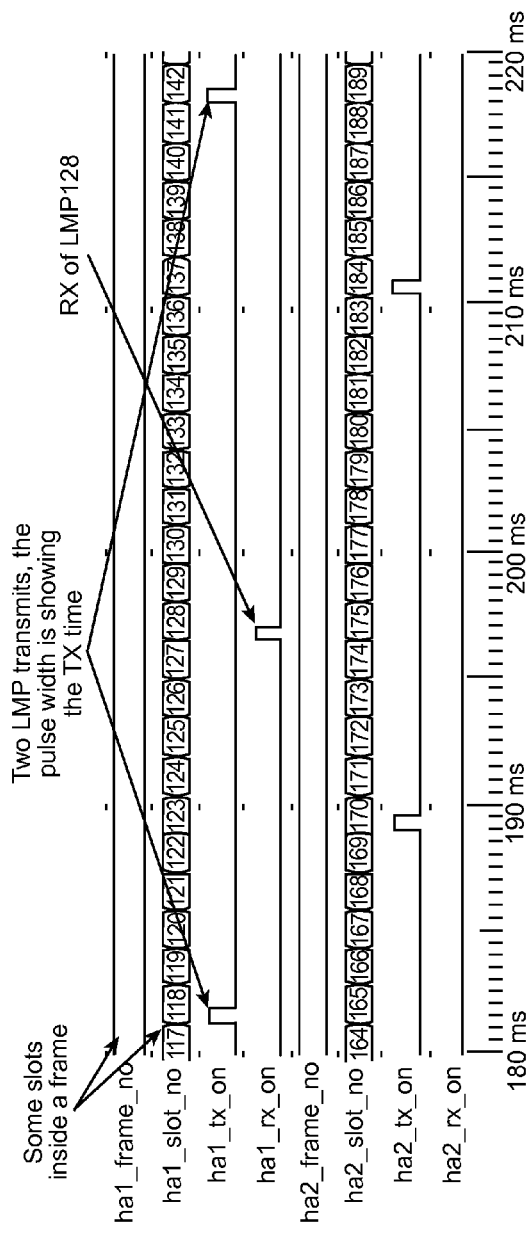
Figure 13:
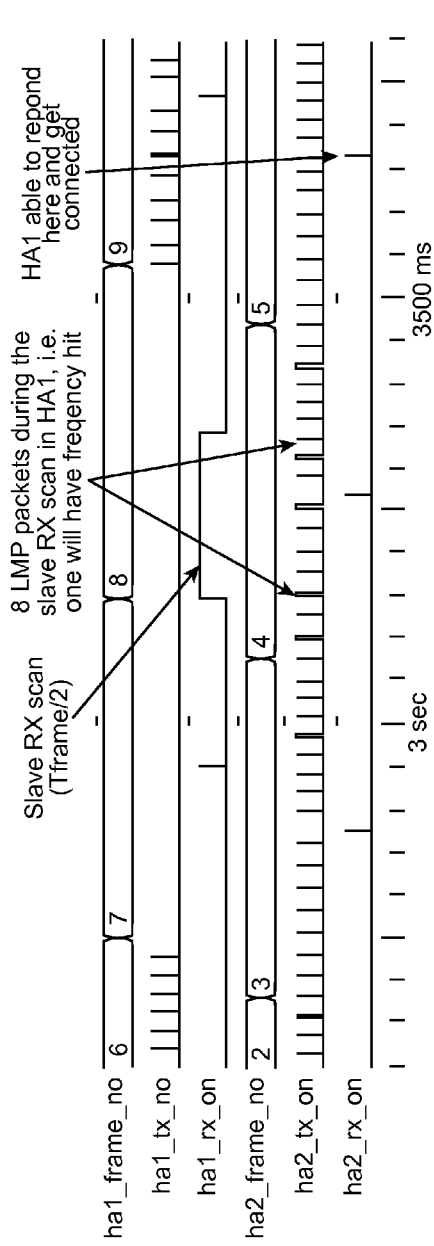
Figure 14:
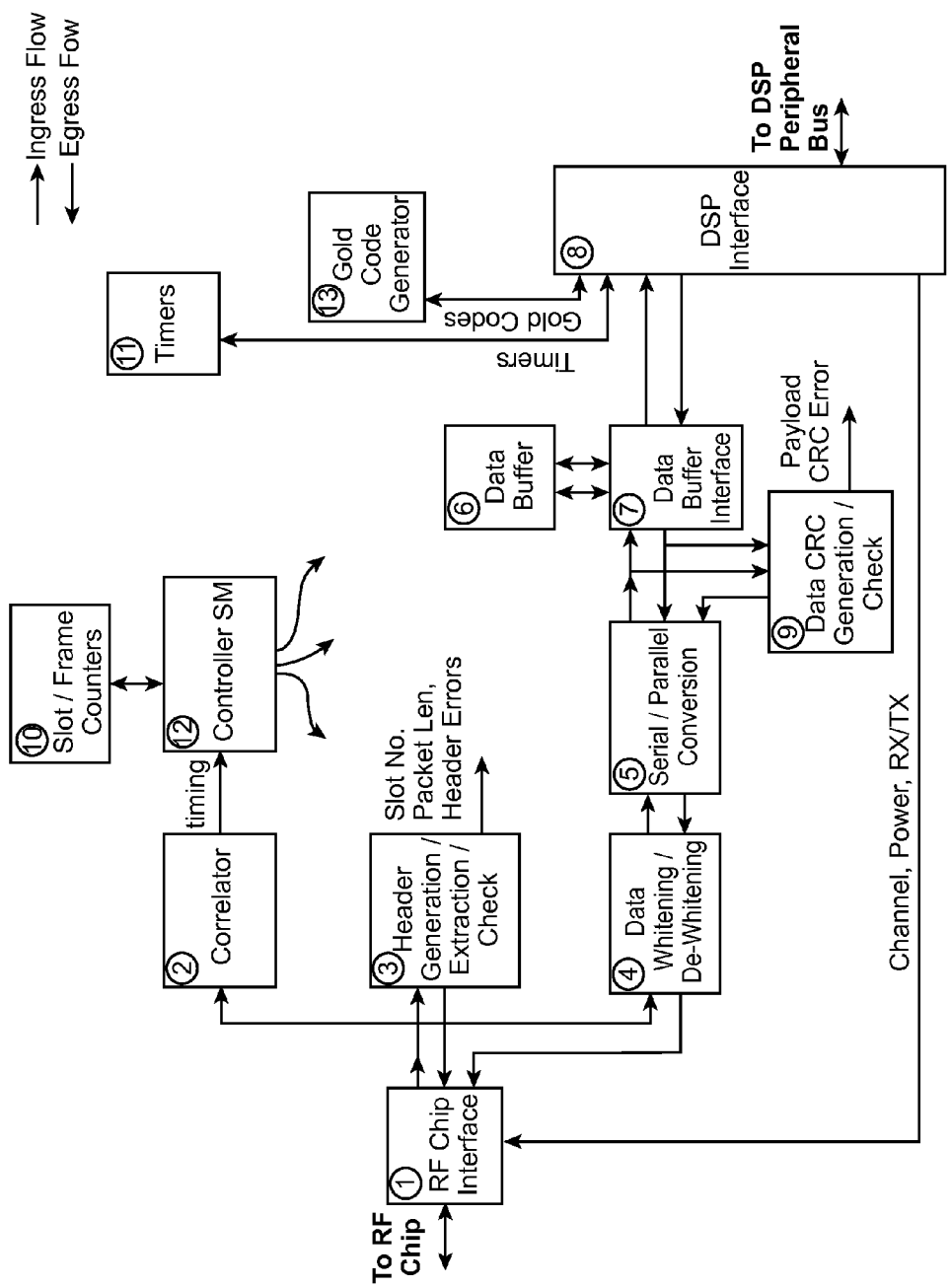

In the following, the invention will be further explained with reference to the drawing wherein:

FIG. 1 schematically illustrates a hearing aid according to the present invention coupled to a wireless network, FIG. 2 illustrates slots and frames, FIG. 3 illustrates slot timing, FIG. 4 illustrates common transmission/reception processing, FIG. 5 illustrates data transmission processing and package assembling, FIG. 6 illustrates data reception processing, FIG. 7 illustrates data exchange of an initial acquisition process, FIG. 8 illustrates data exchange during a hearing aid acquisition process, FIG. 9 illustrates data exchange during a connection negotiation process, FIG. 10 illustrates the timing of a hearing aid acquisition process, FIG. 11 illustrates in more detail two of the frames of FIG. 10, FIG. 12 illustrates details of communication of LMPs of FIG. 10, FIG. 13 illustrates a half frame slave reception, and FIG. 14 is a blocked schematic of a transceiver and communication controller according to the invention.

FIG. 1 schematically illustrates a binaural hearing aid with a left ear hearing aid and a right ear hearing aid, each of which has a transceiver and communication controller for connection with a wireless network interconnecting the two hearing aids, and interconnecting the hearing aids and a plurality of other devices in the wireless network. In the example illustrated in FIG. 1, a doorbell, a mobile phone, a cordless phone, a TV-set, and a fitting instrument are also connected to the wireless network.

A network is a means of interconnecting a set of devices for communication of data between the devices. According to the present invention, one of the devices in the network act as a master device, i.e. it transmits timing information to the other devices in the network for synchronization. Thus, the master device controls the timing of the devices. The other devices are slave devices.

An ID identifies every device. The ID is unique within the network.

The illustrated embodiment of the invention operates in the 2.4 GHz industrial scientific medical (ISM) band. It comprises 80 frequency channels of 1 MHz bandwidth. A frequency hopping TDM scheme is utilized.

During acquisition, the frequency hopping scheme comprises a reduced number of frequency channels, e.g. less than 16 channels, preferably 8 channels, for faster acquisition. Members of the reduced set of frequency channels are denoted acquisition channels. Preferably, the acquisition channels are distributed uniformly throughout the frequency band utilised by the network.

According to the protocol and as shown in FIG. 2, the time is divided into so-called slots that have a length of 1250 μs (twice the length of a minimum Bluetooth™ slot). The slots are numbered from 0 to 255.

256 slots, i.e. slot 0 to slot 255, constitute a frame. Frames are also numbered.

Among factors influencing selection of the length of a slot, is the required lower latency of the system and a desired low overhead with respects to headers and PLL locking. Preferably, the slot length is a multiple of 625 μS, facilitating (i.e. not prevent) that the protocol according to the invention can be implemented on BLUETOOTH™ enabled devices.

Each slot (except slot 128) is used for transmission by one specific device so that data collisions inside the network are prevented. Any slave device may transmit data in slot 128 and hence collisions may occur in this slot. The master device transmits timing information in slot 0. The master devices synchronise their timing circuits, e.g: counters, to the timing information received in slot 0. In one embodiment, each device has a free running symbol, slot and frame counter. The slot and frame counters of a slave device are synchronized with the respective counters of the master device of the network.

A device may use one or more slots for transmission of data. Slots may be allocated during manufacture of a given device, or, slots may be allocated dynamically during acquisition. Preferably, the allocation table is stored in the master device.

The data structure of a slot is illustrated in FIG. 3. The basic device for sending data between devices in a network is a package. A package consists of a header, payload data, and CRC checksums. The CRC checksum only allows determining, if a bit error has occurred (package integrity) eventual error correction may be implemented at a higher layer in the protocol.

A SYNC word is used to detect the start of a package in a slot (or if there is a package). As is well known in the art, a SYNC-word is selected so that it has a low cross-correlation with SYNC-words used in other networks to avoid the possibility of confusioning SYNC-words from different networks. Further the SYNC-word must have a low auto-correlation so that a complete overlap is required for a match to occur whereby accurate timing is provided. In the illustrated embodiment, the SYNC-word is generated with a Gold code-generator.

All devices know a single SYNC word.

The duration of a symbol (1 bit) is 1 μs.

The performance of the present embodiment is: Lowest latency is 1.25 ms. The highest bandwidth is approximately 730 kb/s. The fastest response time is 2.5 ms. The response time is defined as the time from transmission of a request from a device until reception of a reply from another device.

During data communication, the frequency channel is changed for each slot, hence 800 frequency hops are performed every second. The hopping sequence is defined by a very long pseudo random sequence known by all devices connected to the network. The sequence is a function of the identification number (ID) of the master device, hence it allows several distinct networks to co-exist.

The bandwidth of the illustrated embodiment is 730 kb/s (using maximum sized data packages in every slot). The bandwidth can be optimised for each application by selecting a number of slots that has the required aggregated bandwidth.

In FIG. 4, processing common for transmission and reception of data is illustrated. The frequency channel, synchronization word, and the frame/slot number to be utilized have to be determined.

The frame/slot counter is a 40-bit counter. The 8 least significant bits constitute the slot number (SLOT_CNT) and the 32 most significant bits constitute the frame number (FRAME_CNT). In the master device, the frame/slot counter is a free running counter. In a slave device, the frame/slot counter is synchronized to the slot 0 link management package. The SYNC correlation timing performs this synchronization. Thus, the timing of the master device controls package timing, and all slaves synchronize to the master.

A pseudo random number generator generates the RF frequency-hopping channel (CHAN). The seeding value is based on:

The master identification number (MST_ID) so that different networks (e.g. two sets of hearing aids in the same area) will use different sequences to substantially eliminate interference between different sets of hearing aids.

The slot number (SLOT_CNT) so that each slot utilizes a different frequency channel.

The frame number (FRAME_CNT) so that a new sequence is utilized in each frame, i.e. to avoid that slot 0 utilizes the same frequency channel in every transmission.

The frequency channel number (CHAN) generation algorithm does not require storage of previous channel numbers, i.e. there is no memory in the algorithm. The next channel number is calculated based on the current channel number. The pseudo random sequence for the frequency-hopping scheme and for generating the SYNC words is implemented as a hardware block.

Package assembling and transmission processing is further illustrated in FIG. 5. The preamble and synchronization guard are fixed patterns. The synchronization word is either a copy of the two possible SYNC words (generated "once" by the SYNC word generation).

The rest of the package is generated by concatenation of the package header, the payload and the CRC of the payload. A seed using the CHAN whitens the package data. The whitening is necessary to suppress the data DC.

Data reception processing is further illustrated in FIG. 6. The receiver searches for a package by correlation to the known SYNC word (MS_SYNC or LMP_SYNC). If the correlation succeeds, the bit timing and the position in time of the first bit after the SYNC are known. The PREAMB and SYNCGUARD are ignored.

The header and payload fields are first de-whitened using the CHAN.

The different fields of the raw package are checked for errors.

The whitening algorithm is implemented in hardware and is implemented with a linear feedback shift register (LFSR).

The Error checking algorithm protocol (at the base band level) does not implement forward error correction. The only error checking performed is on the SLOTNUM and PKTLEN fields in the header, and using a CRC-16 checksum on the data part of the payload. Additional error checking or correction of the data part may be implemented in the application layer.

The hearing aid acquisition process will now be described with reference to FIGS. 7-13 showing timing diagrams of the initialisation of a network by two hearing aids. In this example, the acquisition time is the time for establishment of the new network.

An acquisition method that consumes little power and still is fast is provided.

TABLE 1

| Acquisition times | | |
|---|---|---|
| Acquisition mode | Time | Description |
| Initial acquisition | 0 s-10.2 s (5.1 s average) | When a new network is established, e.g. when two hearing instruments are powered on and establish a network. |
| Acquisition into existing network | 0 s-82 s (41 s average) | When a network is already establish and a new device tries to connect with the network |
| High Power acquisition | 0 s-2.56 s (1.28 s average) | Same as above, but this mode is VERY power consuming and cannot be used with $ZnO_2$ batteries (but excellent for e.g. a remote control) |

Acquisition is achieved when a device successfully receives a link management package in slot "0" and replies to it in slot "128".

The acquisition process has the two conflicting requirements of fast acquisition time and low power consumption (which corresponds to low transceiver and communication controller activity). The acquisition process according to the present invention saves power and still provides fast acquisition. Different devices may use different acquisition processes in accordance with their power capacity. For example devices that are not subject to power limitations may use a faster acquisition process requiring more power.

As illustrated in FIG. 7, two hearing aids seeking to establish a new network, both transmit LM NULL link management packages as interrogation data. The hearing aid that first receives the LM NULL package from the other hearing aid turns into a slave in the network and synchronizes to the other hearing aid using the timing information in the LM NULL package. Then the slave device transmits a LM REQ package in slot 128 to the other hearing aid that turns into the master of the network and transmits a LM REQ ACK in slot 0 whereby the network is established. The master device continues to transmit timing information in slot 0 for synchronization of slave devices in the network.

FIG. 8 illustrates the acquisition process in more detail. In the illustrated embodiment, an acquisition cycle comprises 32 frames. In a selected half frame, the communication controller controls the transceiver to enable reception of data at a selected acquisition channel. The position in the acquisition cycle of the half frame selected for reception may be determined by a pseudo-random number generator to avoid synchronization with the other hearing aid. Further, the selected acquisition channel may be selected by another pseudo-random number generator for obtaining the advantages of the frequency hopping scheme described above. In the other frames, Link management packages LMPs are transmitted with a high rate to increase the speed of the acquisition. In the embodiment illustrated in FIG. 8, an LMP is transmitted in every 16 slot. Thus, 16 LMPs are transmitted within a frame.

Due to the frequency hopping of the transmission of the 16 LMPs in each frame, all of the 8 acquisition channels are visited once within a half frame. Thus, enabling reception of the transceiver during a half frame ensures that the receiving device will receive one of the transmitted LMPs. No LMPs are transmitted within the frame preceding the receiving half frame so that the other hearing aid may respond to the previously transmitted LMPs.

According to the acquisition process, the first hearing aid receiving an LMP in the half frame turns into a slave in the network (in FIG. 8 hearing aid HA 1 turns into the slave and hearing aid HA 2 turns into the master).

In the event that a new device makes an acquisition to an existing network, the above-mentioned acquisition cycle of 32 frames may be repeated until the new device receives an LMP from the master in the existing network, or, an LMP from the new device "hits" slot 128 of the master. Since the master is in the connected mode, it transmits only one LMP per frame and thus, the probability of the new device receiving an LMP is reduced by a factor of 8 compared to the acquisition process described above for network initialisation. In each acquisition cycle, the half frame for reception is positioned differently within the cycle so that some of the cycles will receive data in slot 0 of the master.

After reception of the LMP, the hearing aid enters into the connection negotiation process illustrated in FIG. 9.

The LM_NULL package received by the slave contains timing information enabling the slave to be synchronized with the other hearing aid and thus, the slave can respond with an LMP in the, from now on, shared slot 128, namely a LM_REGREQ package that notifies the slave to the master. The master responds with a LM_REGACK. From this point in time, the two devices are connected. The master continues to transmit LMPs in slot 0 for synchronization (and other purposes) of slaves in the network.

In the hearing aid acquisition process illustrated in FIGS. 7-9, both hearing aids starts in the acquisition mode, i.e. initially they do not form part of a network.

FIG. 10 is a timing diagram illustrating the acquisition sequence of 32 frames (ha1_frame_no: 0-31). FIGS. 11-13 illustrate various parts of the timing diagram of FIG. 10 as indicated by the frame and slot numbers. The first hearing aid that performs the half frame reception will receive an LMP. Thus, the maximum acquisition time is the 32-frame cycle (12.6 s), and the average acquisition time is about 6 s. The acquisition time ranges from 0 s to 12.5 s depending on the initial timing differences between the two hearing aids.

In an existing network, e.g., with a hearing aid acting as a master device and, e.g., a remote control, the acquisition process is slower. If a second hearing aid is turned on, it powers up in an acquisition mode, but the master hearing aid continues transmission of LMPs in slot 0 at the normal rate.

Devices that have a larger battery/power capacity than a hearing aid, may use an acquisition process that receives continuously until an LMP is received.

Preferably, each device is capable of selectively acting as a master device or a slave device in the network whereby a robust system is provided. Further, a slave device is preferably capable of detecting presence of the master device and capable of reacting to absence of a master.

In a preferred embodiment, the slave devices change state and enter the acquisition mode when no Link management packages have been received in slot 0 for a predetermined period of time. If still no Link management packages are received, the slave devices start transmission of Link management packages in accordance with the network initialisation process described above.

For example, an existing network may comprise two hearing aids and a remote control device, the right hearing aid being the master device. If the user turns the right hearing aid (master) off, the network loses its master device, and the remaining devices must perform network recovery (which is no different from the initial network establishment) as described above.

Since the transmission of data from the transceiver of the hearing aid according to the present invention requires little power, certain devices that are located at a large distance from the master device (e.g. a doorbell) may not be able to pick up the link management packages from the master, and hence such devices may not connect to the network. Devices in the network may receive data from such remotely located devices utilising a special protocol.

Typically, remotely located devices, such as a doorbell, a cooker timer, etc, do not rely on $ZnO_2$ batteries as a power source, and they are capable of transmitting high power signals for long period of times.

In one embodiment, one or more slots and one or more frequency channels are allocated for transmission of data from remotely located devices.

For example, when a doorbell rings it transmits multiple packages back to back for several seconds in accordance with the present invention. Devices in the network, such as a hearing aid that may use the data from the doorbell, listens on the allocated channels in allocated slots for the transmitted signals.

In one embodiment, transceiver channels 9, 49 and 79 are allocated for such devices, and the remote devices transmit data for 4 seconds on each of the three transceiver channels.

In a preferred embodiment, the hearing aid is adapted for manual selection of a master device of the network for reception of broadcast audio signals, e.g. using remote control or buttons on the hearing aid.

For example, an auditorium may be equipped with a powerful transmitter (broadcast device), which broadcasts audio data. When a user enters the auditorium he/she may select to force the hearing aid(s) to use the broadcasting device as a master. The broadcast device does not rely on reception of any data from the hearing instruments (uni-directional communication).

FIG. 14 is a blocked schematic of a transceiver and communication controller according to the invention. FIG. 14 also illustrates the major data flow in ingress and egress.

In ingress, the RF chip interface 1 sends SPI commands to the RF chip for configuration. The RF chip interface receives a data stream from the RF chip.

The correlator 2 extracts the slot and frame timing from the sync word, so that the rest of the receive chain can be synchronized. Based on this timing, the header extraction block 3 analyses the package header and extracts the slot number and package length. Any errors in the header are reported. The data de-whitening block 4 de-whitens the package data. The data is then converted to 16 bits parallel by the serial-parallel conversion block 5. The package data is stored in an internal data buffer 6 by the data buffer interface 7. The data is then accessible to the DSP via the DSP interface 8 through the peripheral bus. A CRC check can also be performed on the package data 9. All internal configuration registers and results of header checks, CRC errors etc are accessible though the DSP interface.

Slot and frame counters 10 are also provided as well as a number of hardware timers 11.

The controller state machine 12 is responsible for overall timing of the base-band engine.

A gold code generator 13 provides hardware assistance to the software in order to generate gold codes used to program the sync words.

In egress, the RF chip interface 1 sends SPI commands to the RF chip for configuration.

The DSP writes a package of data to the data buffer 6, 7 via the DSP interface 8. The package data has a CRC calculated via the data CRC generation block 9. The combined data payload and CRC are then converted to serial 5 and whitened 4. The package header is constructed by the header generation block 3 and then appended to the data. The completed package is then streamed to the RF chip by the RF chip interface 1.

While there have been described what are considered to be the preferred embodiments of this invention, it will be obvious to those skilled in the art that various changes and modifications may be made therein without departing from the invention.

The invention claimed is:

1. A method of initializing a wireless communication network comprising a hearing device including a wireless transceiver and a communication device comprising an other wireless transceiver, the method comprising:
    transmitting interrogation data packets wirelessly by the hearing device and the communication device, respectively;
    turning one of the hearing device and the communication device first receiving one of the interrogation data packets into a slave device in the wireless communication network; and
    transmitting a reception acknowledgement data packet from the slave device indicating that the one of the interrogation data packets was received;
    turning the other one of the hearing device and the communication device into a master device in the wireless communication network upon receipt of the reception acknowledgement data packet from the slave device.

2. The method according to claim 1, further comprising synchronizing the slave device to timing information data contained in the one of the interrogation data packets received by the slave device.

3. The method according to claim 1, further comprising transmitting an acknowledgement data packet from the master device to the slave device indicating that the wireless communication network is established.

4. The method according to claim 1, wherein the reception acknowledgement data packet is transmitted from the slave device in a timeslot allocated for reception acknowledgement data packet transmission.

5. The method according to claim 1, further comprising controlling each of the transceivers in the wireless communication network to enable reception of data packets at a predetermined acquisition channel.

6. The method according to claim 5, further comprising selecting the acquisition channel according to a frequency hopping scheme.

7. The method according to claim 1, further comprising transmitting an additional interrogation data packet by the master device in a timeslot allocated to interrogation data packet transmission after the master device has received the reception acknowledgement data packet from the slave device.

8. The method according to claim 7, further comprising turning an additional communication device into an additional slave device when the additional communication device receives the additional interrogation data packet from the master device in the timeslot allocated to interrogation data packet transmission after the master device has received the reception acknowledgement data packet from the slave device.

9. The method according to claim 4, further comprising turning an additional communication device into an additional slave device when the master device receives an additional interrogation data packet from the additional communication device.

10. The method according to claim 1, further comprising transmitting an additional interrogation data packet by the slave device when the slave device does not receive any additional interrogation data packet from the master device in a predetermined period of time.

11. The method according to claim 1, wherein at least one frequency channel is allocated for transmission of data from remotely located devices with respect to the wireless communication network.

12. A method of initializing a wireless communication network comprising a hearing device including a wireless transceiver and a communication device comprising another wireless transceiver, the method comprising:
    transmitting interrogation data packets wirelessly by the hearing device and the communication device, respectively;
    turning one of the hearing device and the communication device first receiving one of the interrogation data packets into a slave device in the wireless communication network; and
    transmitting a reception acknowledgement data packet from the slave device indicating that the one of the interrogation data packets was received.

13. The method according to claim 12, further comprising synchronizing the slave device to timing information data contained in the one of the interrogation data packets received by the slave device.

14. The method according to claim 12, further comprising transmitting a reception acknowledgement data packet from the slave device in a timeslot allocated for reception acknowledgement data packet transmission.

15. The method according to claim 12, further comprising controlling each of the transceivers in the wireless communication network to enable reception of data packets at a predetermined acquisition channel.

16. A hearing device comprising :
    a wireless transceiver; and
    a digital signal processor communicatively coupled to the transceiver and configured to transmit a first interrogation data packet wirelessly via the wireless transceiver;
    wherein the digital signal processor is further configured to turn the hearing device into a slave in a wireless communication network when the hearing device receives a second interrogation data packet from another device in the wireless communication network.

17. The hearing device according to claim 16, wherein the digital signal processor is further configured to synchronize to timing information data contained in the second interrogation data packet received by the hearing device.

18. The hearing device according to claim 16, wherein the digital signal processor is further configured to transmit a reception acknowledgement data packet in a timeslot allocated for reception acknowledgement data packet transmission.

19. A hearing device comprising:
a wireless transceiver; and
a digital signal processor communicatively coupled to the transceiver and configured to transmit a first interrogation data packet wirelessly via the wireless transceiver;
wherein the digital signal processor is further configured to turn the hearing device into a master in a wireless communication network when the hearing device receives a reception acknowledgement data packet from a first communication device in the wireless communication network before the hearing device receives a second interrogation data packet from the first communication device or another communication device in the wireless communication network.

20. The hearing device according to claim 19, wherein the digital signal processor is further configured to transmit an acknowledgement data packet to the first communication device from which the reception acknowledgement data packet is received, wherein the acknowledgement data packet is for indicating that the wireless communication network is established.

21. The hearing device according to claim 19, wherein the digital signal processor is further configured to transmit an additional interrogation data packet in a timeslot allocated for transmitting the additional interrogation data packet after the hearing device has received the reception acknowledgement data packet.

* * * * *